(12) United States Patent
Geng et al.

(10) Patent No.: US 11,834,809 B2
(45) Date of Patent: Dec. 5, 2023

(54) WHEELED ENGINEERING VEHICLE FOR IMPROVING OPERATION EFFICIENCY

(71) Applicant: JIANGSU XCMG CONSTRUCTION MACHINERY RESEARCH INSTITUTE LTD., Jiangsu (CN)

(72) Inventors: Yanbo Geng, Jiangsu (CN); Haicheng Ning, Jiangsu (CN); Bin Zhao, Jiangsu (CN)

(73) Assignee: JIANGSU XCMG CONSTRUCTION MACHINERY RESEARCH INSTITUTE LTD., Jiangsu (CN)

( * ) Notice: Subject to any disclaimer, the term of this patent is extended or adjusted under 35 U.S.C. 154(b) by 103 days.

(21) Appl. No.: 17/609,037

(22) PCT Filed: Oct. 15, 2020

(86) PCT No.: PCT/CN2020/121116
§ 371 (c)(1),
(2) Date: Nov. 5, 2021

(87) PCT Pub. No.: WO2021/169321
PCT Pub. Date: Sep. 2, 2021

(65) Prior Publication Data
US 2022/0213665 A1 Jul. 7, 2022

(30) Foreign Application Priority Data
Oct. 12, 2020 (CN) .......................... 202011084837.0

(51) Int. Cl.
*B60S 9/12* (2006.01)
*E02F 9/08* (2006.01)
*E02F 3/96* (2006.01)

(52) U.S. Cl.
CPC ................ *E02F 9/085* (2013.01); *B60S 9/12* (2013.01); *E02F 3/964* (2013.01)

(58) Field of Classification Search
CPC ... E02F 9/085; E02F 3/964; E02F 3/32; E02F 9/2228; B60S 9/12; B66C 23/80; E04G 21/0436
(Continued)

(56) References Cited

U.S. PATENT DOCUMENTS 3,831,774 A 8/1974 Moore
10,221,541 B1 * 3/2019 Colbert ..................... B60S 9/12
(Continued)

FOREIGN PATENT DOCUMENTS

CN 203472823 U 3/2014
CN 206069244 U 4/2017
(Continued)

OTHER PUBLICATIONS

Translation of EP 3271219 B1 accessed at www.espacenet.com on Apr. 12, 2023. (Year: 2019).*
(Continued)

*Primary Examiner* — James A Shriver, II
*Assistant Examiner* — Hilary L Johns
(74) *Attorney, Agent, or Firm* — Venable LLP

(57) ABSTRACT

A wheeled engineering vehicle includes a frame; a first telescopic cylinder disposed on the frame; and a stabilizer assembly connected with the first telescopic cylinder and configured to rotate relative to the frame under drive of the first telescopic cylinder. The stabilizer assembly includes: a first stabilizer leg having a hollow structure; a second telescopic cylinder disposed in the first stabilizer leg; a second stabilizer leg configured to extend or retract relative to the first stabilizer leg under drive of the second telescopic cylinder, and the first stabilizer leg configured to radially limit the second stabilizer leg; and a stabilizer foot connected to the second end of the second stabilizer leg and configured to be in contact with the ground to support the
(Continued)

vehicle. The first stabilizer leg, the second stabilizer leg and the stabilizer foot cooperate to support the whole vehicle to improve the stability of the vehicle.

12 Claims, 2 Drawing Sheets

(58) Field of Classification Search
USPC .................................................. 280/764.1
See application file for complete search history.

(56) References Cited

U.S. PATENT DOCUMENTS

| | | | | |
|---|---|---|---|---|
| 2003/0038466 A1* | 2/2003 | Fugel | ................. | E04G 21/0436 280/765.1 |
| 2005/0262741 A1* | 12/2005 | Bietz | ...................... | E02F 9/085 37/443 |
| 2013/0074377 A1* | 3/2013 | Colbert | .................. | E02F 9/085 280/765.1 |

FOREIGN PATENT DOCUMENTS

| | | | | |
|---|---|---|---|---|
| CN | 108082147 | A | 5/2018 | |
| CN | 208949960 | U | 6/2019 | |
| CN | 211034989 | U | 7/2020 | |
| CN | 111733905 | A | 10/2020 | |
| EP | 3271219 | B1 * | 12/2019 | ............. F41A 23/56 |
| EP | 3271219 | B1 | 12/2019 | |
| FR | 2577302 | A1 | 8/1986 | |
| JP | 07268905 | A * | 10/1995 | |
| JP | H07268905 | A | 10/1995 | |
| JP | 2010071011 | A | 4/2010 | |

OTHER PUBLICATIONS

Translation of JPH07268905 accessed at www.espacenet.com on Apr. 12, 2023. (Year: 1994).*
EP 20920863.6 Search Report dated Dec. 16, 2022.
International Search Report and Written Opinion dated Jul. 9, 2021 in International Application PCT/CN2020/121116.
Office Action dated Jun. 3, 2021 in Chinese Application No. 202011084837.0.

* cited by examiner

WHEELED ENGINEERING VEHICLE FOR IMPROVING OPERATION EFFICIENCY

CROSS-REFERENCE TO RELATED APPLICATIONS

The present application is a national stage application, filed under 35 U.S.C. § 371, of International Application No. PCT/CN2020/121116, filed on Oct. 15, 2020, which claims priority to Chinese Application No. 202011084837.0, filed on Oct. 12, 2020, both of which are incorporated herein by reference in their entireties.

TECHNICAL FIELD

The present disclosure relates to the field of engineering machinery, in particular to a wheeled engineering vehicle for improving operation efficiency.

BACKGROUND

A backhoe loader is a multi-functional wheeled engineering vehicle integrating excavation and loading together. In order to meet the needs of excavation operating conditions and operation safety, the backhoe loader must be in rigid contact with the ground so as to prevent the whole vehicle from swaying. Therefore, it needs a support device that props up the whole vehicle and lifts tires off the ground. The inventor found that wheeled engineering vehicles in related arts have the problem of poor stability when being supported by the support device.

SUMMARY

Some embodiments of the present disclosure provide a wheeled engineering vehicle for improving operation efficiency, including:
a frame;
a first telescopic cylinder disposed on the frame; and
a stabilizer assembly connected with the first telescopic cylinder and configured to rotate relative to the frame under a drive of the first telescopic cylinder, the stabilizer assembly including:
a first stabilizer leg constructed to be of a hollow structure, of which a first end is articulated with the frame, and of which a second end is a free end;
a second telescopic cylinder disposed in the first stabilizer leg;
a second stabilizer leg, of which a first end in a telescoping direction is located in the first stabilizer leg and connected to the second telescopic cylinder, and of which a second end in the telescoping direction is located outside the first stabilizer leg via the second end of the first stabilizer leg, the second stabilizer leg being configured to extend or retract relative to the first stabilizer leg under a drive of the second telescopic cylinder, and the first stabilizer leg being configured to radially limit the second stabilizer leg; and
a stabilizer foot connected to the second end of the second stabilizer leg and configured to be in contact with the ground to support the wheeled engineering vehicle.

In some embodiments, the second stabilizer leg and the second telescopic cylinder are rotatably connected.

In some embodiments, the stabilizer assembly includes a bearing, through which the second stabilizer leg is connected to the second telescopic cylinder.

In some embodiments, the stabilizer assembly further includes a first supporting member, which is disposed in the first stabilizer leg and is in clearance fit with a part of the second stabilizer leg located inside the first stabilizer leg.

In some embodiments, the first supporting member includes a shaft sleeve.

In some embodiments, a first end of the first telescopic cylinder is articulated with the frame, and a second end of the first telescopic cylinder is articulated with the first stabilizer leg.

In some embodiments, the first telescopic cylinder is articulated with the second end of the first stabilizer leg.

In some embodiments, the stabilizer foot is rotatably connected to the second end of the second stabilizer leg.

In some embodiments, the stabilizer foot is provided with at least two second supporting members, and the stabilizer foot is configured to be rotatable so that one of the at least two second supporting members contacts the ground for supporting.

In some embodiments, at least one of the at least two second supporting members is different from the other second supporting members in structure.

In some embodiments, the second supporting member includes a resilient member, a toothed member, or a hooked member.

In some embodiments, the stabilizer assembly further includes a positioning structure, which is configured to lock the stabilizer foot and the second stabilizer leg when the stabilizer foot rotates to cause one of the second supporting members supports the ground.

In some embodiments, the positioning structure includes a positioning member, at least two first positioning holes formed in the stabilizer foot, and a second positioning hole formed in the second stabilizer leg; one of the at least two first positioning holes being aligned with the second positioning hole when one of the second supporting members supports the ground, and the positioning member being configured to be inserted into the first positioning hole and the second positioning hole to lock the stabilizer foot and the second stabilizer leg.

In some embodiments, the wheeled engineering vehicle includes an excavating side, and the stabilizer assembly is disposed at the excavating side.

Based on the above-mentioned technical solutions, the present disclosure at least has the following beneficial effects:

In some embodiments, the stabilizer assembly can be folded on lateral parts of a chassis under the drive of the first telescopic cylinder, and the stabilizer assembly can be unfolded relative to the chassis under the drive of the first telescopic cylinder to support the whole vehicle. The second stabilizer leg of the stabilizer assembly can extend relative to the first stabilizer leg under the drive of the second telescopic cylinder to achieve a larger support span, or the second stabilizer leg retracts relative to the first stabilizer leg under the drive of the second telescopic cylinder, so as to be suitable for different ground operating conditions. The first stabilizer leg is used to protect the second telescopic cylinder and to guide the extension and retraction of the second stabilizer leg. The first stabilizer leg and the second stabilizer leg cooperate to support the whole vehicle, which improves the stability of the whole vehicle.

BRIEF DESCRIPTION OF THE DRAWINGS

The accompanying drawings illustrated herein are used to provide further understanding of the present disclosure and constitute a part of the present application, and the illustrative embodiments of the present disclosure and the illustration thereof are used to interpret the present disclosure, but do not constitute improper limitations to the present disclosure. In the drawings.

DETAILED DESCRIPTION

The technical solutions in the embodiments will be clearly and completely described below in conjunction with the accompanying drawings in the embodiments of the present disclosure. Apparently, the embodiments described are merely part of the embodiments of the present disclosure, rather than all of the embodiments. All other embodiments obtained by those of ordinary skill in the art based on the embodiments of the present disclosure without creative efforts fall within the protection scope of the present disclosure.

In the description of the present disclosure, it should be understood that the directional or positional relationships indicated by terms "center", "longitudinal", "lateral", "front", "rear", "left", "right", "vertical", "horizontal", "top", "bottom", "inner", "outer", etc. are directional or positional relationships shown based on the drawings, which are merely for facilitating the description of the present disclosure and simplification of the description, instead of indicating or implying that the referred devices or elements must have specific directions or be constructed and operated in specific directions, and thus cannot be construed as limitations to the protection scope of the present disclosure.

Some embodiments of the present disclosure provide a wheeled engineering vehicle for improving operation efficiency, which is used for alleviating the problem of poor stability.

Figure 1:
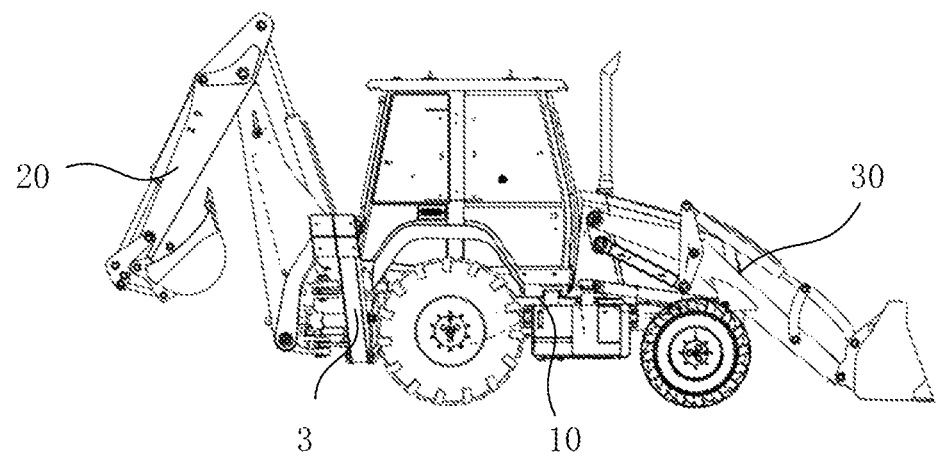
FIG. 1 is a schematic diagram of a backhoe loader provided according to some embodiments of the present disclosure.

Referring to FIG. 1, the backhoe loader includes an excavating side 20 and a loading side 30. Wherein, the excavating side 20 includes an excavating arm and excavator bucket for excavation, and the loading side 30 includes a loading arm and scraper bucket for loading. The backhoe loader is required to be in rigid contact with the ground when performing excavation work, so as to avoid swaying of the whole vehicle. Therefore, the backhoe loader is provided with a support device, and the support device supports the ground to prop up the whole vehicle and lift tires off the ground.

The support device generally includes stabilizer legs disposed on two sides of the excavating side 20. In order to meet the excavating operation requirements of complex ground operating conditions, especially the construction operation requirements of uneven field operating conditions, the requirements on the stability of the whole vehicle is very high, so it is necessary to increase the support span and support height of two stabilizer legs as much as possible.

Figure 2:
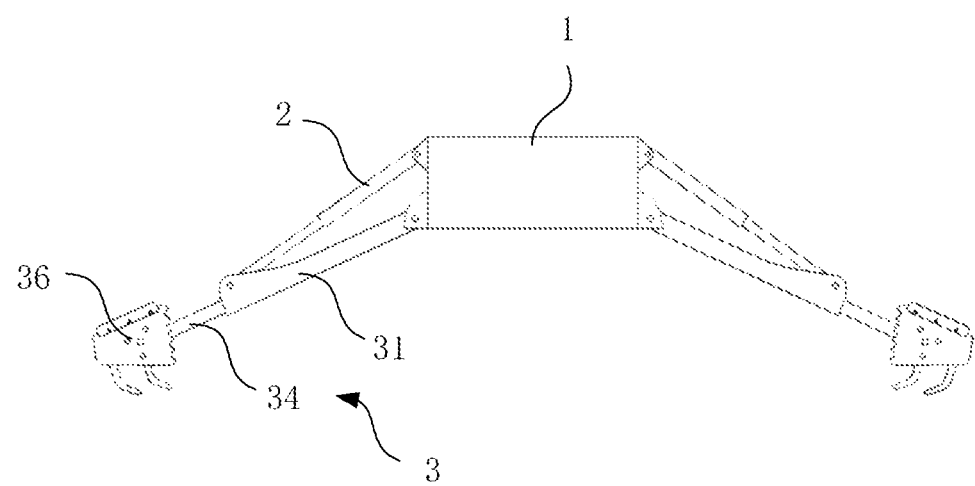
FIG. 2 is a schematic diagram of a support device for a wheeled engineering vehicle provided according to some embodiments of the present disclosure.

Based on this, as shown in FIG. 2, some embodiments of the present disclosure provide a wheeled engineering vehicle for improving operation efficiency. The wheeled engineering vehicle includes the support device, and the support device is disposed to improve the stability of supporting the wheeled engineering vehicle. Wherein, the support device includes a frame 1, a first telescopic cylinder 2 and a stabilizer assembly 3.

The frame 1 is configured to be disposed on a chassis of the wheeled engineering vehicle, or the frame 1 is configured to be integrated with the chassis of the wheeled engineering vehicle.

The first telescopic cylinder 2 is disposed on the frame 1. The stabilizer assembly 3 is connected with the first telescopic cylinder 2 in a driven manner, and is configured to rotate relative to the frame 1 under the drive of the first telescopic cylinder 2. When the first telescopic cylinder 2 drives the stabilizer assembly 3 to rotate upwards relative to the frame 1 and to be folded on lateral parts of the chassis, the stabilizer assembly 3 will not exceed the size range of the whole vehicle. When the first telescopic cylinder 2 drives the stabilizer assembly 3 to rotate downwards relative to the frame 1 to contact the ground, the stabilizer assembly 3 is used to support the wheeled engineering vehicle, so as to prop up the whole vehicle and lift tires of the wheeled engineering vehicle off the ground.

Figure 3:
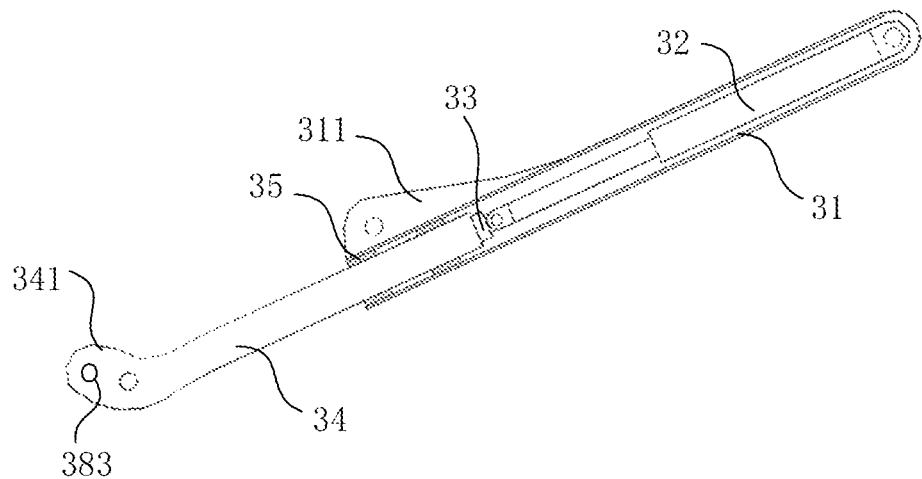
FIG. 3 is a schematic diagram of a first stabilizer leg and a second stabilizer leg provided according to some embodiments of the present disclosure.

As shown in FIG. 3, the stabilizer assembly 3 includes a first stabilizer leg 31. The first stabilizer leg 31 is configured to be of a hollow structure, a first end of the first stabilizer leg 31 is articulated with the frame 1, and a second end of the first stabilizer leg 31 is a free end.

The stabilizer assembly 3 further includes a second telescopic cylinder 32 disposed in the first stabilizer leg 31.

The stabilizer assembly 3 further includes a second stabilizer leg 34. The second stabilizer leg 34 includes a first end and a second end 341 in a telescoping direction thereof, and the first end and the second end 341 of the second stabilizer leg 34 are two opposite ends. The first end of the second stabilizer leg 34 is located in the first stabilizer leg 31 and connected to the second telescopic cylinder 32, and the second end 341 of the second stabilizer leg 34 is located outside the first stabilizer leg 31 via the second end of the first stabilizer leg 31.

The second telescopic cylinder 32 is connected to the first stabilizer leg 31 and the second stabilizer leg 34. The second stabilizer leg 34 is configured to extend or retract relative to the first stabilizer leg 31 under a drive of the second telescopic cylinder 32, and the first stabilizer leg 31 is constructed to radially limit the second stabilizer leg 34.

The stabilizer assembly 3 further includes a stabilizer foot 36. The stabilizer foot 36 is connected to the second end 341 of the second stabilizer leg 34 and configured to be in contact with the ground to support the wheeled engineering vehicle. The stabilizer foot 36 is adapted to improve the stability of supporting the whole vehicle.

The stabilizer assembly 3 can be folded on the lateral parts of the chassis under the drive of first telescopic cylinder 2, and the stabilizer assembly 3 can be unfolded relative to the chassis under the drive of the first telescopic cylinder 2 to support the whole vehicle. The second stabilizer leg 34 of the stabilizer assembly 3 can extend relative to the first stabilizer leg 31 under the drive of the second telescopic cylinder 32 to achieve a larger support span, or the second stabilizer leg 34 retracts relative to the first stabilizer leg 31 under the drive of the second telescopic cylinder 32, so as to be suitable for different ground operating conditions. Under the drive of the second telescopic cylinder 32, the second stabilizer leg 34 extends or retracts freely, so that the stabilizer assembly 3 has an enough support span. During construction operation, the operation stability of the whole vehicle is relatively good, very good stability can be achieved without supporting of the scraper bucket of the loading side, and construction operation efficiency is greatly improved.

The second stabilizer leg 34 is configured to extend or retract relative to the first stabilizer leg 31 under the drive of the second telescopic cylinder 32, and the first stabilizer leg 31 is constructed to radially limit the second stabilizer leg 34. The radial force on the second stabilizer leg 34 is transmitted to the first stabilizer leg 31, and then is transmitted to the frame 1 through the first stabilizer leg 31 to prevent a radial force or bending moment generated on the second telescopic cylinder 32 from causing deformation of the second telescopic cylinder 32. Therefore, normal work of the second telescopic cylinder 32 is facilitated, and the service life of the second telescopic cylinder 32 is prolonged. The first stabilizer leg 31 is adapted to protect the second telescopic cylinder 32, and guide extension and retraction of the second stabilizer leg 34. The first stabilizer leg 31 has a main support function. The first stabilizer leg 31 and the second stabilizer leg 34 cooperate to support the whole vehicle, which improves stability of the whole vehicle.

In some embodiments, the second stabilizer leg 34 and the second telescopic cylinder 32 are rotatably connected.

The second stabilizer leg 34 can extend or retract relative to the first stabilizer leg 31 under the drive of the second telescopic cylinder 32 to achieve different support spans. Moreover, the second stabilizer leg 34 is rotatable relative to the second telescopic cylinder 32, so that the second stabilizer leg 34 can meet operating conditions of any angle, and the stabilizer foot 36 is kept in full contact with the ground at all times, which improves the stability of supporting the vehicle and the operation efficiency during the construction operation.

In some embodiments, the stabilizer assembly 3 includes a bearing 33. The second stabilizer leg 34 is connected to the second telescopic cylinder 32 through the bearing 33 to achieve rotation of the second stabilizer leg 34 relative to the second telescopic cylinder 32.

Optionally, the bearing 33 includes a thrust bearing.

In some embodiments, the stabilizer assembly 3 further includes a first supporting member 35. The first supporting member 35 is disposed in the first stabilizer leg 31, and the first supporting member 35 is in clearance fit with the part of the second stabilizer leg 34 located inside the first stabilizer leg 31. The first supporting member 35 is adapted to support the second stabilizer leg 34 to prevent the second stabilizer leg 34 from swaying when the second stabilizer leg 34 extends or retracts relative to the first stabilizer leg 31. In addition, when the second stabilizer leg 34 is subjected to an acting force such as a bending moment or a radial force or the like, the acting force is transmitted to the first stabilizer leg 31 through the first supporting member 35, so as to avoid generating an acting force on the second telescopic cylinder 32, avoid damage to the telescopic cylinder 32, and prolong the service life of the second telescopic cylinder 32.

In some embodiments, the first supporting member 35 includes an annular supporting member, for example, the first supporting member 35 includes a shaft sleeve. The annular supporting member is disposed in the first stabilizer leg 31, and the second stabilizer leg 34 passes through the annular supporting member to be connected to the second telescopic cylinder 32.

Optionally, two or more annular supporting members are disposed in the first stabilizer leg 31, and the two or more annular supporting members are spaced in a length direction of the second stabilizer leg 34.

Optionally, the first supporting member 35 includes supporting blocks. Two or more supporting blocks are disposed in the first stabilizer leg 31, and the two or more supporting blocks are circumferentially disposed around the second stabilizer leg 34.

The first supporting member 35 is disposed in the first stabilizer leg 31, the first supporting member 35 is in clearance fit with the second stabilizer leg 34, and the second stabilizer leg 34 and the second telescopic cylinder 32 are connected by the bearing 33 to realize two degrees of freedom of motion of the second stabilizer leg 34, i.e., extension and retraction, and rotation.

In some embodiments, the first end of the first telescopic cylinder 2 is articulated with the frame 1, and the second end of the first telescopic cylinder 2 is articulated with the first stabilizer leg 31.

In some embodiments, the part at which the first telescopic cylinder 2 is articulated with the first stabilizer leg 31 is located at a part of the first stabilizer leg 31 away from the frame 1 to improve the stability of rotation of the first stabilizer leg 31 relative to the frame 1.

In some embodiments, the first telescopic cylinder 2 is articulated with the second end of the first stabilizer leg 31. Optionally, the outer wall of the second end of the first stabilizer leg 31 is provided with a connector 311, and the first telescopic cylinder 2 is articulated with the connector 311.

In some embodiments, the first telescopic cylinder 2 includes a hydraulic cylinder or an air cylinder.

The first telescopic cylinder 2, the stabilizer assembly 3 and the frame 1 form a triangular motion mechanism. With the telescoping of the first telescopic cylinder 2, the stabilizer assembly 3 moves in an arc-shaped track, contacts the ground when the stabilizer assembly 3 moves downwards, and thus can prop up the whole vehicle.

In some embodiments, the first end of the second telescopic cylinder 32 is articulated with the inner wall of the first end of the first stabilizer leg 31, and the second end of the second telescopic cylinder 32 is articulated with the first end of the second stabilizer leg 34.

In some embodiments, the second telescopic cylinder 32 includes an oil cylinder or an air cylinder.

In some embodiments, as shown in FIG. 2, the stabilizer foot 36 is rotatably disposed at the second end 341 of the second stabilizer leg 34. The stabilizer foot 36 is provided with at least two supporting faces, and the stabilizer foot 36 is configured to rotate so that one of the at least two second supporting faces contacts the ground for supporting. The supporting face is provided with a second supporting member 37.

Optionally, the stabilizer foot 36 is articulated with the second end 341 of the second stabilizer leg 34 through a pin roll, and the stabilizer foot 36 is rotatable relative to the second stabilizer leg 34.

In some embodiments, the stabilizer foot 36 is provided with at least two second supporting members 37, and the stabilizer foot 36 is configured to rotate so that one of the at least two second supporting members 37 contacts the ground for supporting. One second supporting member 37 is disposed on each of the supporting faces.

Figure 4:
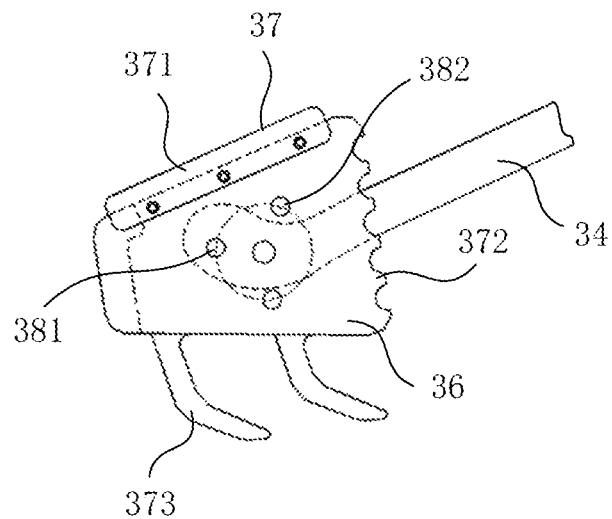
FIG. 4 is a schematic diagram of a stabilizer foot provided according to some embodiments of the present disclosure.

In some embodiments, as shown in FIG. 4, at least one of the at least two second supporting members 37 is different from the other second supporting members 37 in structure.

In some embodiments, the second supporting member 37 includes a resilient member 371 made of a resilient material.

For a cement road surface with a good surface or a place with high road surface requirements, in order to avoid damage to the road surface due to the stabilizer foot 36, one of the supporting faces of the stabilizer foot 36 is provided with a resilient member 371, and the resilient member 371 supports the ground to avoid damage to the ground.

Optionally, the resilient member 371 includes a rubber pad.

In some embodiments, the second supporting member 37 includes a toothed member 372. Optionally, the toothed member 372 is made of steel.

For an earth road surface or a place with low road surface requirements, one of the supporting faces of the stabilizer foot 36 is provided with the toothed member 372. Grip force and friction are increased through the toothed member 372, and a good anti-slip function is achieved to a hard earth road surface.

Optionally, the toothed member 372 includes a rack disposed on the supporting face, or a toothed structure is integrally formed on the supporting face.

In some embodiments, the second supporting member 37 includes a hooked member 373. Optionally, the hooked member 373 is made of steel.

During soft ground construction of farms, forest farms, construction sites and the like, for example, when conventional deep soil excavation is performed, the whole vehicle will slip under the action of an excavation reaction force, which will seriously affect operation stability and construction work efficiency. One of the supporting faces of the stabilizer foot 36 is provided with the hooked member 373, and the hooked member 373 can be inserted into soil when the stabilizer foot 36 performs supporting, so as to stabilize the second stabilizer leg 34 and alleviate the problem of insufficient grip force. When the second stabilizer leg 34 is retracted, it is convenient to pull out the hooked member 373, and the operation is simple and convenient.

Optionally, the hooked member 373 includes two or more bending plates. The bending plates bend towards a direction close to the chassis when inserting into the soil, and can be fixed on the ground through gripping the ground.

In some embodiments, the stabilizer assembly 3 further includes a positioning structure, which is configured to lock the stabilizer foot 36 and the second stabilizer leg 34 when the stabilizer foot 36 rotates so that one of the second supporting members 37 supports the ground. The stabilizer foot 36 will not rotate substantially relative to the second stabilizer leg 34. At this time, the stabilizer foot 36 cannot be rotated to select a supporting face, but the stabilizer foot 36 can rotate slightly relative to the second stabilizer leg 34 to be suitable for uneven ground.

In some embodiments, the positioning structure includes a positioning member 381, at least two first positioning holes 382 formed in the stabilizer foot 36, and a second positioning hole 383 formed in the second stabilizer leg 34. One of the at least two first positioning holes 382 is aligned with the second positioning hole 383 when one of the second supporting members 37 supports the ground, and the positioning member 381 is configured to be inserted into the first positioning hole 382 and the second positioning hole 383 to lock the stabilizer foot 36 and the second stabilizer leg 34.

In some embodiments, the second end 341 of the second stabilizer leg 34 is articulated with the stabilizer foot 36 through an articulated shaft, and the part at which the second stabilizer leg 34 is articulated with the stabilizer foot 36 is located in axial direction of the second stabilizer leg 34. The second positioning hole 383 formed in the second end 341 of the second stabilizer leg 34 deviates from the axial direction of the second stabilizer leg 34.

In some embodiments, as shown in FIG. 3, the second end 341 of the second stabilizer leg 34 is constructed to be in a bent shape, the bent part of the second end 341 is articulated with the stabilizer foot 36 through a pin roll, and the part at which the second stabilizer leg 34 is articulated with the stabilizer foot 36 is located in the axial direction of the second stabilizer leg 34. The second positioning hole 383 is formed in a bent end portion of the second end 341, and the second positioning hole 383 deviates from the axial direction of the second stabilizer leg 34. After the positioning member 381 is inserted to connect and position the 36 and the second stabilizer leg 34, the stabilizer foot 36 can rotate slightly relative to the second stabilizer leg 34 to adjust the angle so as to be suitable for uneven ground.

The stabilizer foot 36 is articulated with the second stabilizer leg 34. Although the stabilizer foot 36 and the second stabilizer leg 34 are positioned by the positioning member 381, the stabilizer foot 36 can still rotate slightly relative to the second stabilizer leg 34. During the supporting process of the second stabilizer leg 34, it can avoid that the stabilizer foot 36 is not parallel to the ground when the vehicle is tilted back and forth due to different ground angles. In addition, even if an angle change is formed between the second stabilizer leg 34 and the ground, since the second stabilizer leg 34 is rotatable relative to the first stabilizer leg 31, the stabilizer foot 36 can rotate slightly relative to the second stabilizer leg 34, which can also ensure that the stabilizer foot 36 is dynamically parallel to the ground in the left and right directions, which increases the contact area, effectively deals with the angle change in the vehicle operation process, ensures that the stabilizer foot 36 is parallel to the ground, and improves the stability.

In some embodiments, the stabilizer foot 36 is provided with at least two second supporting members 37 with different structures, which can be quickly and flexibly switched for different operating conditions, and especially for soft ground construction, slipping or tilting of the whole vehicle due to insufficient grip force of the stabilizer foot 36 can be avoided, thereby greatly improving the operation stability and construction work efficiency of the whole vehicle.

By rotating the stabilizer foot 36, after the corresponding second supporting member 37 is selected, the stabilizer foot 36 and the second stabilizer leg 34 are connected and positioned by the positioning member 381, and the stabilizer foot 36 can rotate slightly relative to the second stabilizer leg 34, so as to be suitable for ground with different flatness, thereby effectively improving the efficiency and effect of operation and construction.

In some embodiments, each of the two sides of the frame 1 is provided with the first telescopic cylinder 2 and the stabilizer assembly 3, that is, each of the two sides of the excavating side of the wheeled engineering vehicle is provided with the first telescopic cylinder 2 and the stabilizer assembly 3 to steadily support the whole vehicle.

In some embodiments, the stabilizer assembly 3 is driven by the first telescopic cylinder 2, can rotate upwards relative to the frame 1 to be folded on lateral parts of the chassis, and can rotate downwards relative to the frame 1 to contact the ground so as to support the wheeled engineering vehicle. The second stabilizer leg 34 is driven by the second telescopic cylinder 32 to extend or retract relative to the frame 1 to adjust different support spans. The second stabilizer leg 34 can rotate relative to the first stabilizer leg 31 to perform adaptive adjustment according to the flatness of the ground, so that the stabilizer foot 36 is kept in full contact with the ground at all times.

The second stabilizer leg 34 can extend or retract relative to the first stabilizer leg 31 and is rotatable, and the stabilizer foot 36 is rotatable relative to the second stabilizer leg 34 to select the corresponding second supporting member 37 to support the ground. Moreover, after the stabilizer foot 36 and the second stabilizer leg 34 are connected and positioned by the positioning member 381, the stabilizer foot 36 can be adjusted in a small angle range relative to the second stabilizer leg 34. Through rotation of the second stabilizer leg 34 and circumferential rotation of the stabilizer foot 36 itself at a certain angle, stable contact support between the stabilizer foot 36 and the ground can be facilitated under any ground flatness.

The stabilizer foot 36 is provided with at least two types of second supporting members 37, which can be alternatively used by rotating the stabilizer foot 36. The operation is convenient, and different functions can be switched to be suitable for ground with different operating conditions.

Some specific embodiments of the wheeled engineering vehicle will be described below in conjunction with FIGS. 2-4.

As shown in FIG. 2, the support device of the wheeled engineering vehicle includes the frame 1, the first telescopic cylinder 2 and the stabilizer assembly 3. The frame 1 is disposed on the chassis of the wheeled engineering vehicle optionally, or the frame 1 is a part of the chassis of the wheeled engineering vehicle.

Each of the two sides of the frame 1 is provided with the first telescopic cylinder 2 and the stabilizer assembly 3. The first end of the first telescopic cylinder 2 is articulated with the frame 1, and the second end of the first telescopic cylinder 2 is articulated with the stabilizer assembly 3. The first end of the stabilizer assembly 3 is articulated with the frame 1, and the second end of the stabilizer assembly 3 is used to support the ground. The part at which the first telescopic cylinder 2 is articulated with the stabilizer assembly 3 is located between the first and second ends of the stabilizer assembly 3.

As shown in FIGS. 2 and 3, the stabilizer assembly 3 includes the first stabilizer leg 31, the second telescopic cylinder 32, the bearing 33, the second stabilizer leg 34 and the first supporting member 35.

The first stabilizer leg 31 is of a hollow structure, similar to a sleeve. The first end of the first stabilizer leg 31 is a closed end and is articulated with the frame 1. The second end of the first stabilizer leg 31 is an open end and is a free end.

The second telescopic cylinder 32 is located in the first stabilizer leg 31, the first end of the second telescopic cylinder 32 is articulated with the inner wall of the first end of the first stabilizer leg 31. The second end of the second telescopic cylinder 32 is articulated with the first end of the second stabilizer leg 34 through the bearing 33.

The first end of the second stabilizer leg 34 is located in the first stabilizer leg 31. At least two first supporting members 35 are disposed in the first stabilizer leg 31. The first support member 35 is a shaft sleeve and is in clearance fit with the second stabilizer leg 34 to ensure that the second stabilizer leg 34 can achieve circumferential rotation and axial movement, thereby avoiding swaying of the second stabilizer leg 34. In addition, the first support 35 can transmit the acting force of the second stabilizer leg 34 to the first stabilizer leg 31, thereby avoiding deformation of the second telescopic cylinder 32 due to the force. The second end 31 of the second stabilizer leg 34 extends from the open end of the first stabilizer leg 31 and is located outside the first stabilizer leg 31 to connect the stabilizer foot 36.

The outer wall of the first stabilizer leg 31 is provided with a connector 341, the connector 341 is located at the second end of the first stabilizer leg 31, and the second end of the first telescopic cylinder 2 is articulated with the connector 341.

As shown in FIGS. 2 and 4, the stabilizer assembly 3 further includes the stabilizer foot 36, the supporting member 37 and the positioning member 381.

The stabilizer foot 36 is articulated with the second stabilizer leg 34 through a pin roll. The stabilizer foot 36 can rotate around the second stabilizer leg 34, which ensures that the stabilizer foot 36 is completely parallel to the ground, in the course that the second stabilizer leg 34 supports the ground, thereby effectively improving the grip force and stability, and avoiding ground damage caused by uneven stress.

The stabilizer foot 36 is provided with three supporting faces. One of the three supporting faces is provided with a resilient member 371, another supporting face of the three supporting faces is provided with a hooked member 373, and the rest supporting face of the three supporting faces is provided with a toothed member 372, which can deal with various operating conditions, especially for soft ground. The operation stability and operation efficiency of the whole vehicle are greatly improved.

Three first positioning holes 382 are formed in the stabilizer foot 36, and one second positioning hole 383 is formed in the second end 341 of the second stabilizer leg 34. The stabilizer foot 36 is rotated to select one of the three supporting faces to support the ground, so that one of the three first positioning holes 382 in the stabilizer foot 36 is aligned with the second positioning hole 383 in the second stabilizer leg 34. At this time, the positioning member 381 is inserted to connect and position the stabilizer foot 36 and the second stabilizer leg 34, so that the second supporting member 37 on the supporting plate 36 contacts the ground for supporting.

The second end 341 of the second stabilizer leg 34 is constructed to be in a bent shape, and the bent part of the second end 341 is articulated with the stabilizer foot 36 through a pin roll. The second positioning hole 383 is formed in a bent end portion of the second end 341. By setting the second end 341 of the second stabilizer leg 34 into a bent shape, when the positioning member 381 is inserted, the stabilizer foot 38 can rotate within a certain angle range relative to the second stabilizer leg 34, so as to meet the change of the angle between the stabilizer leg and the ground in the supporting process.

In some embodiments, the stabilizer assembly 3 can realize three degrees of freedom of motion. First, the stabilizer assembly 3 can rotate axially around a vehicle body; second, the second stabilizer leg 34 can freely extend or retract; and third, the stabilizer foot 36 can passively rotate around the second stabilizer leg 34 and match the multifunctional stabilizer foot 36, which can greatly improve the stability of the excavating operation, and improve operation safety and construction efficiency.

In some embodiments, the wheeled engineering vehicle includes the excavating side 20, and the stabilizer assembly 3 is disposed at the excavating side 20.

As shown in FIG. 1, the wheeled engineering vehicle is a backhoe loader, which includes the excavating side 20 and the loading side 30. The stabilizer assembly 3 is disposed at the excavating side 20, and supports the whole backhoe loader to lift tires of the backhoe loader off the ground.

Each of the two sides of the chassis of the backhoe loader is provided with the first telescopic cylinder 2 and the stabilizer assembly 3.

In the description of the present disclosure, it should be understood that the words such as "first", "second" and "third" are used to define components and parts, which is only for the convenience of distinguishing the above-mentioned components and parts. Unless otherwise stated, the above-mentioned words have no special meaning, and thus cannot be understood as limitations to the protection scope of the present disclosure.

In addition, the technical features of one of the embodiments can be beneficially combined with the other one or more embodiments without explicit negation.

Finally, it should be noted that the above embodiments are only used to illustrate the technical solutions of the present disclosure, instead of limiting the same. Although the present disclosure has been described in detail with reference to preferred embodiments, those of ordinary skill in the art should understand that the specific embodiments of the present disclosure can be modified or a part of the technical features can be equivalently substituted without departing from the spirit of the technical solutions of the present disclosure, and all the modification and substitution should be compassed in the scope of the technical solutions claimed by the present disclosure.

The invention claimed is:

1. A wheeled engineering vehicle for improving operation efficiency, comprising:
a frame;
a first telescopic cylinder disposed on the frame; and
a stabilizer assembly connected with the first telescopic cylinder and configured to rotate relative to the frame under a drive of the first telescopic cylinder, the stabilizer assembly comprising:
a first stabilizer leg constructed to be of a hollow structure, of which a first end is articulated with the frame, and of which a second end is a free end;
a second telescopic cylinder disposed in the first stabilizer leg;
a second stabilizer leg, of which a first end in a telescoping direction is located in the first stabilizer leg and connected to the second telescopic cylinder, and of which a second end in the telescoping direction is located outside the first stabilizer leg via the second end of the first stabilizer leg, the second stabilizer leg being configured to extend or retract relative to the first stabilizer leg under a drive of the second telescopic cylinder, and the first stabilizer leg being configured to limit the second stabilizer leg, wherein the second stabilizer leg and the second telescopic cylinder are rotatably connected, and wherein the stabilizer assembly comprises a bearing, through which the second stabilizer leg is connected to the second telescopic cylinder; and
a stabilizer foot connected to the second end of the second stabilizer leg and configured to be in contact with the ground to support the wheeled engineering vehicle.

2. The wheeled engineering vehicle according to claim 1, wherein the stabilizer assembly further comprises a first supporting member, wherein the first supporting member is disposed in the first stabilizer leg and is in clearance fit with a part of the second stabilizer leg located inside the first stabilizer leg.

3. The wheeled engineering vehicle according to claim 2, wherein the first supporting member comprises a shaft sleeve.

4. The wheeled engineering vehicle according to claim 1, wherein a first end of the first telescopic cylinder is articulated with the frame, and a second end of the first telescopic cylinder is articulated with the first stabilizer leg.

5. The wheeled engineering vehicle according to claim 4, wherein the first telescopic cylinder is articulated with the second end of the first stabilizer leg.

6. The wheeled engineering vehicle according to claim 1, wherein the stabilizer foot is rotatably connected to the second end of the second stabilizer leg.

7. The wheeled engineering vehicle according to claim 6, wherein the stabilizer foot is provided with at least two second supporting members, and the stabilizer foot is rotatable so that one of the at least two second supporting members contacts the ground for supporting.

8. The wheeled engineering vehicle according to claim 7, wherein at least one of the at least two second supporting members is different from the other second supporting members in structure.

9. The wheeled engineering vehicle according to claim 7, wherein the second supporting member comprises a resilient member, a toothed member, or a hooked member.

10. The wheeled engineering vehicle according to claim 7, wherein the stabilizer assembly further comprises a positioning structure, which is configured to lock the stabilizer foot and the second stabilizer leg when the stabilizer foot rotates to cause one of the second supporting members supports the ground.

11. The wheeled engineering vehicle according to claim 10, wherein the positioning structure comprises a positioning member, at least two first positioning holes formed in the stabilizer foot, and a second positioning hole formed in the second stabilizer leg; one of the at least two first positioning holes being aligned with the second positioning hole when one of the second supporting members supports the ground, and the positioning member being configured to be inserted into the first positioning hole and the second positioning hole to lock the stabilizer foot and the second stabilizer leg.

12. The wheeled engineering vehicle according to claim 1, comprising an excavating side, wherein the stabilizer assembly is disposed at the excavating side.

* * * * *